United States Patent
Sato

(10) Patent No.: US 12,293,236 B2
(45) Date of Patent: May 6, 2025

(54) SCALING PROCESSING SYSTEMS BASED ON DATABASE ACCESSIBILITY STATE

(71) Applicant: CANON KABUSHIKI KAISHA, Tokyo (JP)

(72) Inventor: Junko Sato, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 623 days.

(21) Appl. No.: 17/341,102

(22) Filed: Jun. 7, 2021

(65) Prior Publication Data

US 2021/0389995 A1 Dec. 16, 2021

(30) Foreign Application Priority Data

Jun. 10, 2020 (JP) ................................ 2020-101026

(51) Int. Cl.
*G06F 9/50* (2006.01)
*G06F 9/48* (2006.01)

(52) U.S. Cl.
CPC .......... *G06F 9/5083* (2013.01); *G06F 9/4881* (2013.01); *G06F 9/505* (2013.01); *G06F 9/5077* (2013.01)

(58) Field of Classification Search
CPC ...... G06F 9/5083; G06F 9/4881; G06F 9/505; G06F 9/5077
See application file for complete search history.

(56) References Cited

U.S. PATENT DOCUMENTS

| | | | | |
|---|---|---|---|---|
| 8,234,650 B1 * | 7/2012 | Eppstein | ............. | H04L 67/1025 718/100 |
| 9,647,889 B1 * | 5/2017 | Jones | .................. | H04L 41/0823 |
| 9,953,351 B1 * | 4/2018 | Sivasubramanian | ......................... | G06Q 30/0283 |
| 10,613,899 B1 * | 4/2020 | Saha | ....................... | G06N 20/20 |
| 11,977,711 B1 * | 5/2024 | Kahrs | ................ | G06Q 30/0623 |
| 2005/0038789 A1 * | 2/2005 | Chidambaran | ..... | H04L 67/1031 |
| 2010/0250748 A1 * | 9/2010 | Sivasubramanian | ........................ | G06F 9/5016 711/170 |
| 2016/0156568 A1 * | 6/2016 | Naganuma | .............. | H04L 67/10 709/226 |
| 2016/0170792 A1 * | 6/2016 | Kato | ..................... | G06F 9/5077 718/1 |
| 2016/0323188 A1 * | 11/2016 | Guzman | ............. | H04L 41/0893 |
| 2016/0323377 A1 * | 11/2016 | Einkauf | ................ | G06F 9/5077 |
| 2017/0168867 A1 * | 6/2017 | Ota | ......................... | G06F 9/546 |

(Continued)

FOREIGN PATENT DOCUMENTS

JP 2018532172 A 11/2018

*Primary Examiner* — Benjamin C Wu
(74) *Attorney, Agent, or Firm* — Canon U.S.A., Inc. IP Division

(57) ABSTRACT

An information processing system includes one or more memories, and one or more processors that execute a set of instructions to control adjustment of a resource amount of a processing system configured to execute processing requiring access to a database in response to issuance of an event requiring adjustment of the resource amount of the processing system, wherein, in a case where the database is in an inaccessible state, the resource amount of the processing system is not increased even if a first event requiring an increase of the resource amount of the processing system is issued, and wherein, in a case where the database is in an accessible state, the resource amount of the processing system is increased in response to issuance of the first event.

5 Claims, 8 Drawing Sheets

(56) References Cited

U.S. PATENT DOCUMENTS

| | | | |
|---|---|---|---|
| 2017/0339196 A1* | 11/2017 | Lewis | H04L 63/083 |
| 2017/0344402 A1* | 11/2017 | Pulaski | G06F 9/52 |
| 2020/0097593 A1* | 3/2020 | Chen | G06F 11/3442 |
| 2020/0314168 A1* | 10/2020 | Nauerz | H04L 67/02 |

\* cited by examiner

SCALING PROCESSING SYSTEMS BASED ON DATABASE ACCESSIBILITY STATE

BACKGROUND

Field of the Disclosure

The present disclosure relates to an information processing system and a control method.

Description of the Related Art

In recent years, there is a cloud service as a service where various applications running on a server on the Internet can be used. In the cloud service such as an infrastructure as a service (IaaS) and a platform as a service (PaaS), a cloud service vendor provides a system administrator with a computing resource such as a virtual server, a serverless execution environment, and a storage via a network. The system administrator can use the computing resource provided by the cloud service vendor and construct a system to provide his/her own service.

The system constructed using the cloud service may use a message queue (hereinbelow, referred to as a queue) to process data in parallel. The queue stores a message corresponding to processing target data therein. A processing system (a virtual machine or a serverless execution environment) having a function of processing the message obtains the message stored in the queue and executes processing based on a processing content described in the message. A plurality of processing systems processes the messages obtained from the queues as described above, and thus parallel processing of data can be performed.

As a service referred to as serverless computing, there is, for example, Amazon Web Service (AWS) Fargate. In this service, specifications such as a central processing unit (CPU) and a memory are allocated to an execution unit of a container referred to as a task. Further, price is charged with respect to an amount of the CPU and of a memory resource consumed by the containerized application.

In a case where a message includes processing for updating a database in the parallel processing of data in the system, the processing of one message becomes successful when the update of the database is completed. Representative examples of databases provided by the cloud service are a relational database (RDB), which uses a structured query language (SQL) in accessing data, and a not only SQL (NoSQL) format database, which does not require the SQL in accessing data. The NoSQL format database has high scalability and high availability, and thus is widely used in the cloud service in recent years. On the other hand, the RDB is also used in many services other than the cloud service, but causes a failure and requires regular maintenance due to the nature of the database. During a maintenance period of time, the database cannot be updated in the processing of the above-described message, so that the message that was not able to be processed is stored in the queue again.

The system constructed using the cloud service can automatically adjust a resource amount based on an amount of requests to be received and an event issued in response to a load for processing the requests according to a setting by the system administrator. Japanese Unexamined Patent Application Publication (Translation of PCT Application) No. 2018-532172 discusses an auto scaling function of monitoring the number of requests stored in a queue and changing a resource amount allocated to a system if the number of requests exceeds a threshold value.

Such adjustment processing of the resource amount is automatically executed based on a condition predetermined according to the service provided by the cloud service. The amount of requests is the number of requests received by a load balancer per unit time. The load for processing is a load applied to a virtual machine for processing and refers to CPU utilization, memory utilization, a response time, and the like of the virtual machine. Adjustment of the resource amount in the virtual machine includes scale-out for increasing the number of the virtual machines and scale-in for decreasing the number of the virtual machines. Further, adjustment of the resource amount in the serverless computing includes scale-out for increasing the number of tasks necessary for executing the application to realize the processing in the cloud service and scale-in for decreasing the number of the necessary tasks. The specifications of the CPU, the memory, and the like to be allocated are adjusted according to the number of necessary tasks. The load balancer can automatically perform scale-out and the like based on the amount of requests to be received.

According to the above-described auto scaling function, the resource amount of the processing system can be automatically adjusted based on the amount of requests received by the system and an event issued according to the load for processing the requests. However, if the resource amount for executing processing that requires access to the database is changed, it is necessary to consider an operation state of the database in some cases. For example, the above-described relational database may be regularly maintained. If the resource amount of the processing system is increased in response to issuance of an event requiring an increase of the resource amount even though the database is in an inaccessible state, a wasteful resource cost may be incurred. On the other hand, if the database is in an accessible state, it is necessary to increase the resource amount of the processing system in response to the issuance of the event.

SUMMARY

An information processing system includes one or more memories, and one or more processors that execute a set of instructions to control adjustment of a resource amount of a processing system configured to execute processing requiring access to a database in response to issuance of an event requiring adjustment of the resource amount of the processing system, wherein, in a case where the database is in an inaccessible state, the resource amount of the processing system is not increased even if a first event requiring an increase of the resource amount of the processing system is issued, and wherein, in a case where the database is in an accessible state, the resource amount of the processing system is increased in response to issuance of the first event.

Further features of the present disclosure will become apparent from the following description of exemplary embodiments with reference to the attached drawings.

DESCRIPTION OF THE EMBODIMENTS

Various exemplary embodiments of the present disclosure will be described in detail below with reference to the attached drawings.

Figure 1:
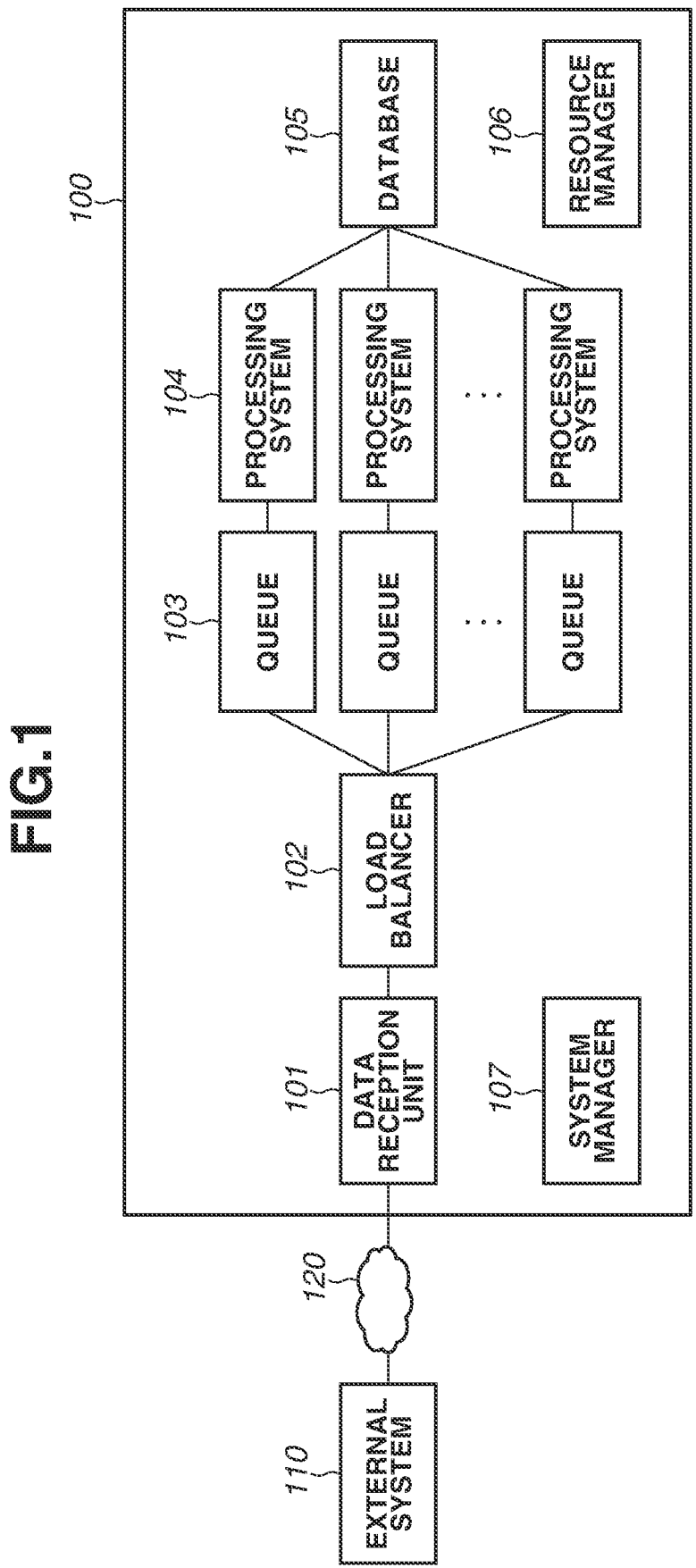
FIG. 1 illustrates a configuration of an information processing system according to the present disclosure.

FIG. 1 illustrates an example of a system configuration according to a first exemplary embodiment of the present disclosure. In the present system, an information processing system 100 and an external system 110 are connected with each other via an Internet 120.

The information processing system 100 includes a data reception unit 101, a load balancer 102, a queue 103, a processing system 104, a database 105, a resource manager 106, and a system manager 107, which are connected with one another via a network. According to the first exemplary embodiment, a case in which data obtained from the external system 110 is processed, and a processing result is stored in the database 105 is described as an example.

The data reception unit 101 is a virtual machine having a function of receiving a message to be a processing target of the processing system 104 from the external system 110 via the Internet 120 and transmitting the message to the load balancer 102. A virtual machine is a logical computer, which divides a server into logical units regardless of a physical configuration by virtualization technology and operates in each of the divided units with an independent operating system.

The load balancer 102 is a load distribution apparatus, which distributes and transfers a request to be the processing target of the processing system 104 received from the data reception unit 101 to a plurality of transfer destinations (the queues 103).

The queue 103 is for managing a message corresponding to the request received from the load balancer 102.

The processing system 104 is a virtual machine having a function of performing necessary processing on the message obtained from the queue 103 and storing a processing result in the database 105. The processing system 104 can be a serverless execution environment using an event driven computing service. According to the present exemplary embodiment, it is described that the processing system 104 executes processing requiring access to the database, but the processing system 104 can have a function of executing other processing.

The database 105 stores a program for realizing the present system, data stored by processing the message by the processing system 104, and various pieces of data for providing a service. As the system configuration according to the present exemplary embodiment, an example is described in which a relational database provided by a cloud service is used as a database.

The resource manager 106 adjusts a resource amount of the processing system 104 based on an instruction from the system manager 107 described below. Adjustment of the resource amount includes scale-out for increasing the number of the virtual machines (or the number of running serverless execution environments) and scale-up for increasing an allocation of hardware resources with respect to the virtual machine (or the serverless execution environment). The adjustment of the resource amount further includes scale-in for decreasing the number of the virtual machines (or the number of the running serverless execution environments) and scale-down for decreasing the allocation of the hardware resources with respect to the virtual machine (or the serverless execution environment). The hardware resources include a central processing unit (CPU) (the number of cores), a memory (a size), and a storage (a size).

The resource manager 106 can monitor an amount of unprocessed messages stored in the queue 103 and automatically adjust the resource amount of the processing system 104. The adjustment of the resource amount executed by the resource manager 106 in a case where an amount of data to be monitored meets a predetermined condition is referred to as auto scaling.

The system manager 107 issues an instruction to the resource manager 106 based on a request from a system administrator. For example, the system manager 107 has functions of issuing an instruction to generate a resource configuring a processing system and the processing system using the resource, and of issuing an instruction to adjust the resource amount.

Figure 2:
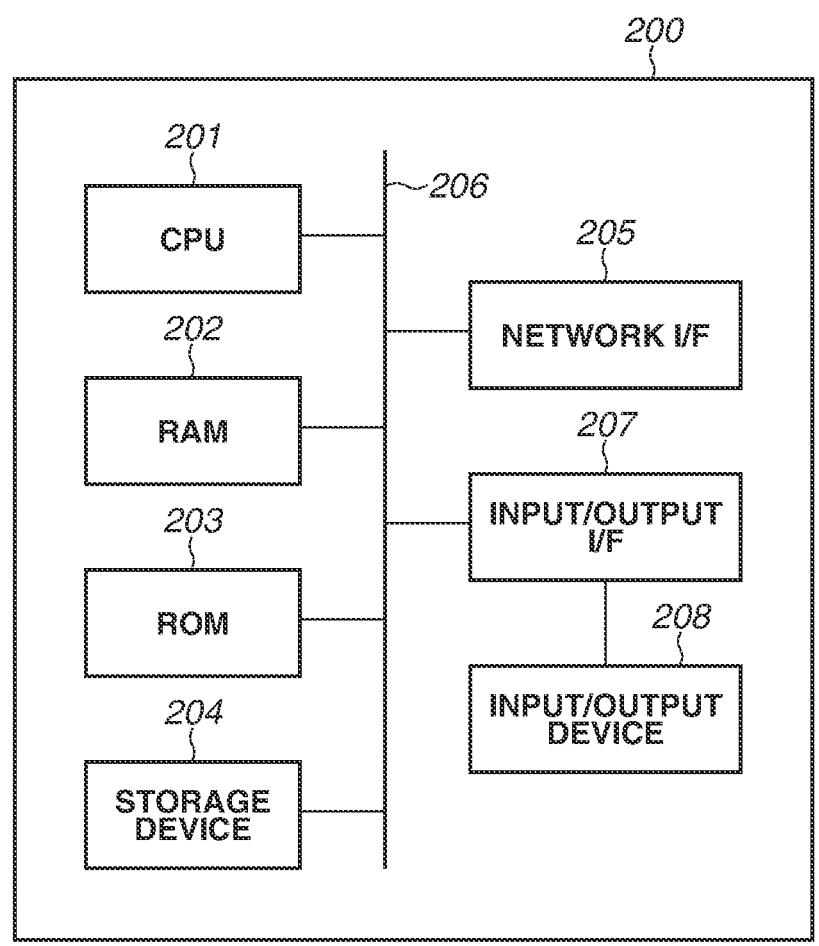
FIG. 2 illustrates an example of a hardware configuration of an information processing apparatus.

FIG. 2 illustrates an example of a hardware configuration of an information processing apparatus 200. The information processing apparatus 200 according to the present exemplary embodiment includes a server computer existing in a data center for constructing the information processing system 100 and a computer having a function of the external system 110.

The information processing apparatus 200 includes a CPU 201 that executes a program stored in a read-only memory (ROM) 203 and comprehensively controls each device via an internal bus 206. A random access memory (RAM) 202, the ROM 203, a storage device 204, a network interface (I/F) 205, and an input/output I/F 207 are connected to the internal bus 206. The input/output I/F 207 includes, for example, a personal system/2 (PS/2), a Universal Serial Bus (USB) I/F, and an analog or digital display I/F. The input/output/F 207 can connect the information processing apparatus 200 to an input/output device 208, such as a keyboard, a mouse, a cathode ray tube (CRT) display, and a liquid crystal display, which are not illustrated. The information processing apparatus 200 performs communication via a local area network (LAN), an intranet environment, and the Internet using the network I/F 205. Accordingly, the information processing apparatus 200 can communicate with a network device and another information processing apparatus. The CPU 201 performs program execution processing together with the RAM 202 and the ROM 203. The CPU 201 can also execute a program for realizing the virtualization technology. Further, the CPU 201 performs processing for storing data in a storage medium such as the storage device 204. The storage device 204 functions as an external storage device, stores various types of information, and can also store various system information and processing information instead of the RAM 202.

Figure 3:
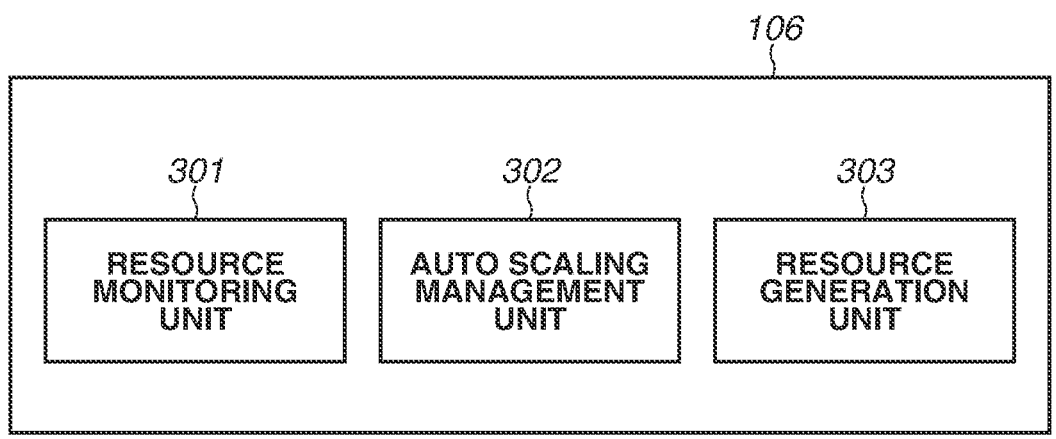
FIG. 3 illustrates an example of a configuration of a resource manager.

FIG. 3 illustrates an example of a configuration of the resource manager 106.

A resource monitoring unit 301 monitors states and performances of the processing system 104 and a server component. The server component according to the present exemplary embodiment is the load balancer 102 and the like. For example, the resource monitoring unit 301 monitors the number of requests per unit time in the load balancer 102, and CPU utilization, memory utilization, and the number of unprocessed messages in the queue in the virtual machine (or the serverless execution environment).

In a case where a monitoring result meets a condition predetermined by the system administrator, the resource monitoring unit 301 transmits an Alarm event. An auto scaling management unit 302 receives the Alarm event and generates a virtual machine (or a serverless execution environment) in response to the Alarm event.

The auto scaling management unit 302 manages auto scaling with respect to the processing system 104 and the server component. The auto scaling management unit 302 manages the virtual machine and the server component to be an auto scaling target by a group unit. The group is referred to as an auto scaling group. For example, the auto scaling management unit 302 manages a plurality of processing systems 104 as one auto scaling group. The auto scaling management unit 302 controls the number of the virtual machines and/or the server components, which belong to the auto scaling group and are in operation, to be the number set as a required number. The required number is determined by a request from the system administrator. The required number can be set in advance by a cloud service provider.

In a case where the number of operating machines is less than the required number, the auto scaling management unit 302 requests a resource generation unit 303 to generate a virtual machine and the like and adds the generated virtual machine and the like to the corresponding auto scaling group. In a case where the auto scaling group is associated with the load balancer 102, the auto scaling management unit 302 connects the added virtual machine and/or server component to the corresponding load balancer 102. On the other hand, in a case where the number of operating machines is more than the required number, the auto scaling management unit 302 deletes the virtual machine from the auto scaling group and requests the resource generation unit 303 to stop the virtual machine. In a case where the auto scaling group is associated with the load balancer 102, the auto scaling management unit 302 releases the connection between the virtual machine and/or the server component that are/is to be deleted and the load balancer 102. The load balancer 102 stops transmitting a request to the virtual machine to be deleted and releases the connection thereto after no request being processed exists. The auto scaling management unit 302 requests the resource generation unit 303 to stop the virtual machine after the connection between the processing system 104 and/or the server component and the load balancer 102 is released. Processing for setting the required number of the auto scaling group when the resource monitoring unit 301 transmits the Alarm event is referred to as an auto scaling policy. The system administrator specifies, for example, to increase the required number by one, to decrease the required number by one, or to set the required number to 20, and the resource monitoring unit 301 adjusts the resource amount in response to the request from the system administrator. Further, the auto scaling management unit 302 manages information about an auto scaling state. The information about the auto scaling state includes the number and the specifications of the virtual machines and an auto scaling operation most recently executed.

The resource generation unit 303 receives a request from the auto scaling management unit 302 and generates a virtual machine and/or a server component based on the request. The resource generation unit 303 receives the request from the system administrator in various ways. For example, the resource generation unit 303 can receive the request from the system administrator using a graphical user interface (GUI), an application programming interface (API), and the like provided by the information processing system 100. The request from the system administrator includes the number and the types of the virtual machines. The type of the virtual machine can include an operation system (OS), an application server, and system and application configurations, all of which can be selected by the system administrator. The server component includes the load balancer 102 and the queue 103 but is not limited to them. After the information processing system 100 generates the processing system 104 satisfying the request from the system administrator, the system administrator can change a setting of the processing system 104.

Figure 4:
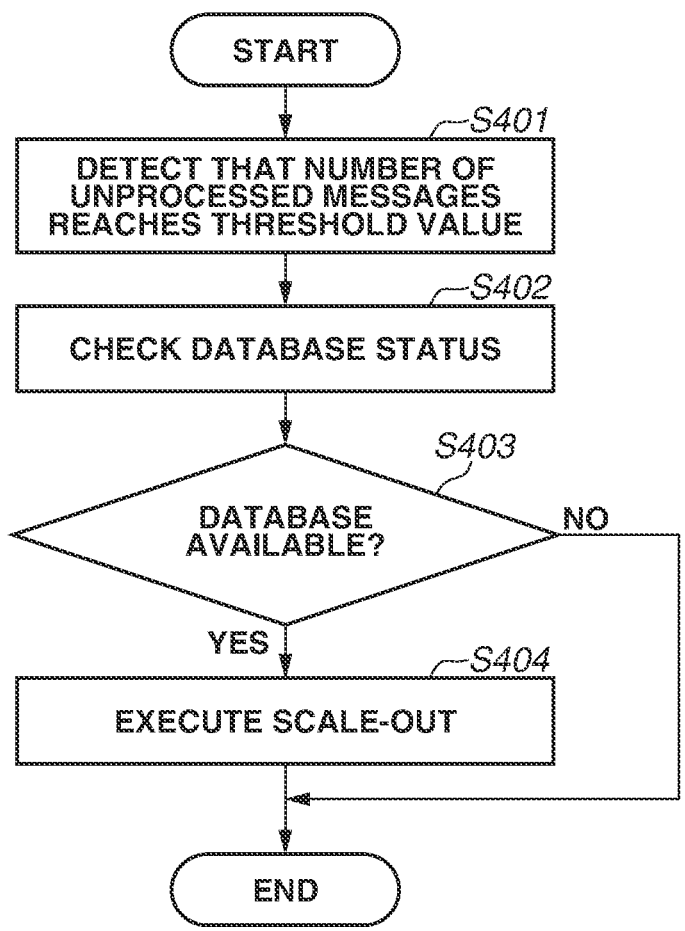
FIG. 4 is a flowchart illustrating resource adjustment processing by the resource manager.

FIG. 4 is a flowchart illustrating an example of adjustment processing (auto scaling processing) of the resource amount of the processing system 104 by the resource manager 106 in the information processing system 100. The auto scaling processing described in the present flowchart is processing performed based on a result of a status check of the database 105.

In a case where the processing system 104 is serverless computing in the processing illustrated in FIGS. 4 to 8, the resource generation unit 303 increases the number of tasks necessary for executing the application for realizing processing in the cloud service as the scale-out. Further, the resource generation unit 303 decreases the number of tasks necessary for executing the application for realizing processing in the cloud service as the scale-in. Accordingly, the specifications of the CPU and the memory to be allocated are adjusted according to the number of necessary tasks.

In step S401, when the resource monitoring unit 301 detects that the number of unprocessed messages stored in the queue 103 reaches a threshold value, the resource monitoring unit 301 issues an Alarm event to notify the auto scaling management unit 302 of the Alarm event. Upon receiving the notification, in step S402, the auto scaling management unit 302 checks the status of the database 105 using the API. In step S403, the auto scaling management unit 302 determines whether the database 105 is available. In a case where it is determined that the database 105 is in an accessible state (YES in step S403), the processing proceeds to step S404. In step S404, the auto scaling management unit 302 requests the resource generation unit 303 to generate the virtual machine and adds the generated virtual machine to the auto scaling group. On the other hand, in step S403, in a case where it is determined that the database 105 is not in an accessible state (NO in step S403), the auto scaling management unit 302 ends the processing in the flowchart as it is without requesting the resource generation unit 303 to generate the virtual machine.

In a case where it is detected that the status of the database 105 becomes unavailable during monitoring of the number of unprocessed messages stored in the queue 103, the resource manager 106 does not execute scale-out even if an event is issued. Accordingly, wasteful scale-out can be prevented.

Figure 5:
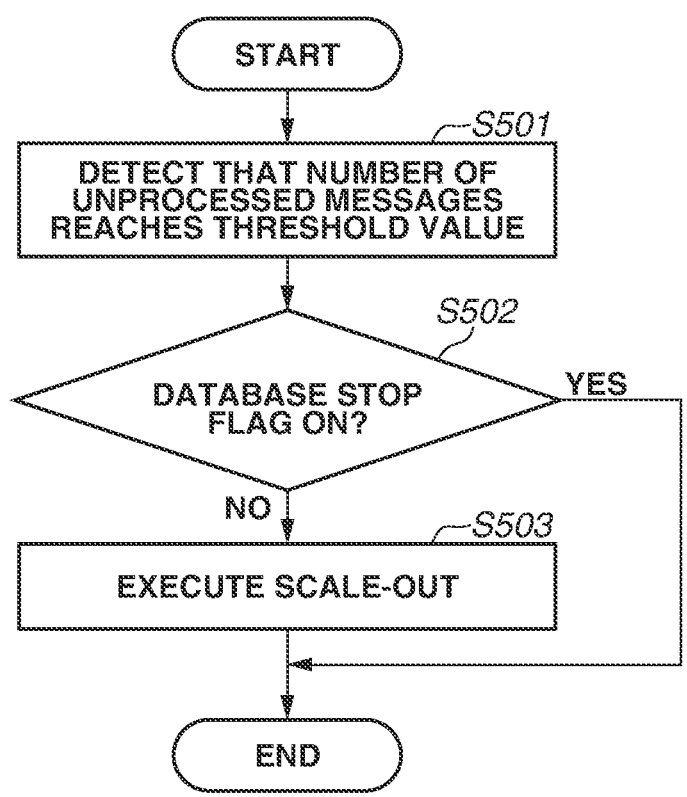
FIG. 5 is a flowchart illustrating resource adjustment processing by the resource manager.

Auto scaling processing performed based on event notification from the database 105 is described with reference to FIG. 5. FIG. 5 is a flowchart illustrating adjustment processing of the resource amount of the processing system 104 by the resource manager 106.

In step S501, when the resource monitoring unit 301 detects that the number of unprocessed messages stored in the queue 103 reaches a threshold value, the resource monitoring unit 301 issues an Alarm event and notifies the auto scaling management unit 302 of the Alarm event. Upon receiving the notification, in step S502, the auto scaling management unit 302 checks whether a stop flag of the database 105 is ON. The stop flag of the database 105 is managed in the auto scaling management unit 302. The stop flag is changed from OFF to ON in a case where the event notification indicating that the database becomes unavailable is received from the resource monitoring unit 301 and is changed again from ON to OFF in a case where the event notification indicating that the database becomes available again is received. In other words, the database stop flag managed in the auto scaling management unit 302 is updated by an event notification issued according to the status change in the database 105. In step S502, in a case where it is determined that the stop flag of the database 105 is not ON (NO in step S502), in step S503, the auto scaling management unit 302 requests the resource generation unit 303 to generate the virtual machine and adds the generated virtual machine to the auto scaling group. On the other hand, in step S502, in a case where it is determined that the stop flag of the database 105 is ON (YES in step S502), the auto scaling management unit 302 ends the processing in the flowchart as it is.

According to the present exemplary embodiment, in a case where the database is in the inaccessible state, the resource amount of the processing system 104 is not increased even if the condition for increasing the resource amount of the processing system 104 is met. Accordingly, wasteful resource consumption and incurrence of a wasteful resource cost can be prevented.

According to the first exemplary embodiment, in a case where the database 105 is unavailable, the auto scaling management unit 302 does not request the resource generation unit 303 to increase the resource amount. According to a first modification, in a case where the database 105 is unavailable, the auto scaling management unit 302 requests the resource generation unit 303 to decrease the resource amount. More specifically, in a case where the database 105 is unavailable, the resource manager 106 performs scale-in on the processing system 104 to a minimum unit (a minimum number of the virtual machines set for the auto scaling group).

Figure 6:
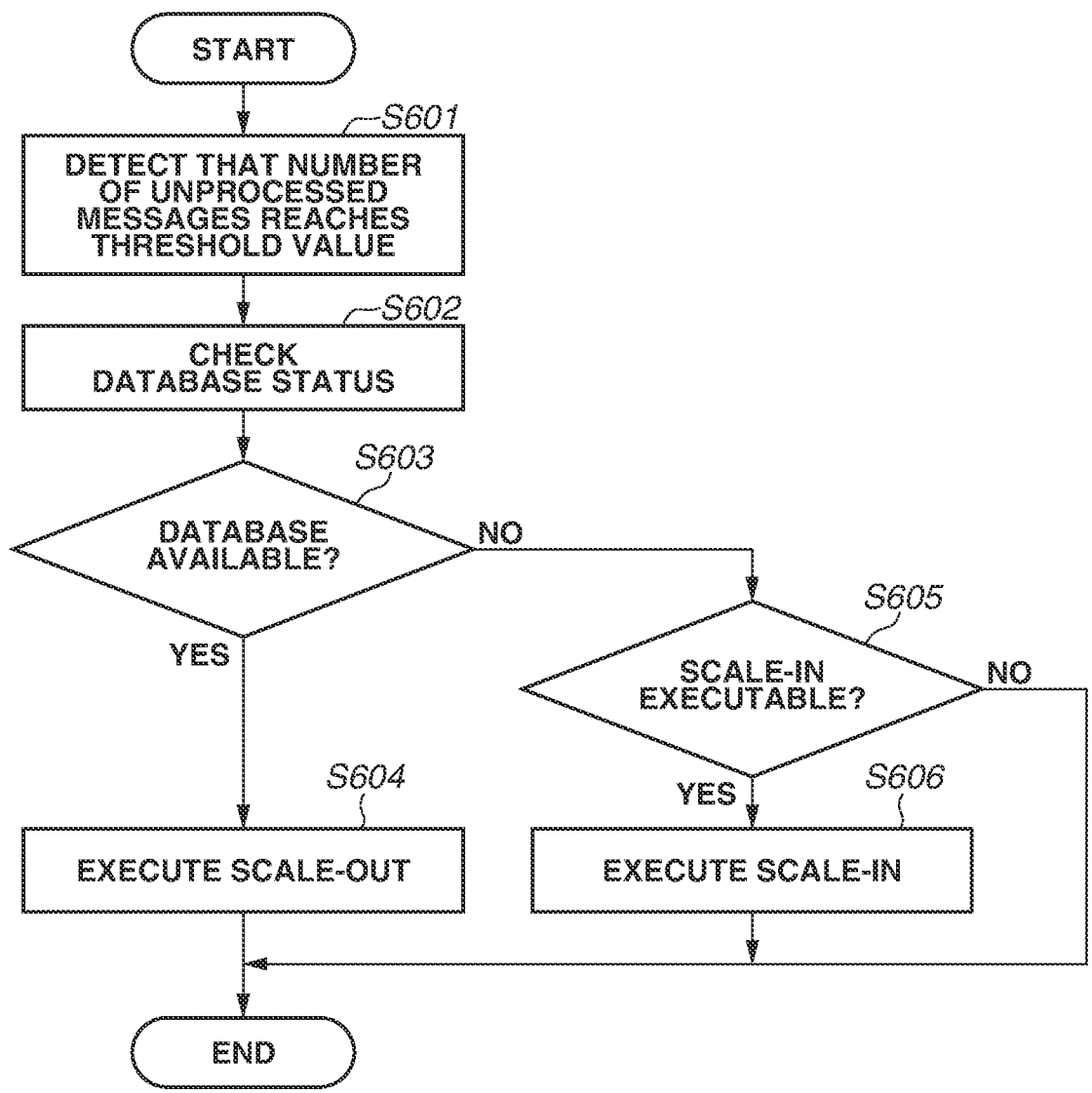
FIG. 6 is a flowchart illustrating resource adjustment processing by the resource manager.

FIG. 6 is a flowchart illustrating adjustment processing of the resource amount of the processing system 104 by the resource manager 106. The auto scaling processing described in the present flowchart is processing performed based on a result of the status check of the database 105. In addition to the processing illustrated in FIG. 4, scale-in is executed in the processing system 104 in a case where the database 105 is unavailable and the scale-in can be executed in the processing system 104.

In step S601, when the resource monitoring unit 301 detects that the number of unprocessed messages stored in the queue 103 reaches a threshold value, the resource monitoring unit 301 issues an Alarm event and notifies the auto scaling management unit 302 of the Alarm event. Upon receiving the notification, in step S602, the auto scaling management unit 302 checks the status of the database 105. In step S603, the auto scaling management unit 302 determines whether the database 105 is available. In step S603, in a case where it is determined that the database 105 is available (YES in step S603), the processing proceeds to step S604. In step S604, the auto scaling management unit 302 requests the resource generation unit 303 to generate the virtual machine to increase the resource amount and adds the generated virtual machine to the auto scaling group. On the other hand, in step S603, in a case where it is determined that the database 105 is unavailable (NO in step S603), the processing proceeds to step S605. In step S605, the auto scaling management unit 302 determines whether the scale-in can be executed. In step S605, in a case where it is determined that the scale-in can be executed (YES in step S605), then in step S606, the auto scaling management unit 302 executes the scale-in up to the minimum number of the virtual machines set to the auto scaling group. A case where it is determined that the scale-in can be executed is a case where it is determined that the number of the virtual machines in operation is more than the minimum number of the virtual machines set to the auto scaling group. On the other hand, in step S605, in a case where it is determined that the scale-in cannot be executed (in other words, in a case where the number of the virtual machines in operation is the minimum number of the virtual machines set to the auto scaling group), (NO in step S605), the auto scaling management unit 302 ends the processing in the flowchart as it is.

According to the present modification, the resource amount of the processing system 104 is decreased in a case where the database 105 is unavailable even if it is determined that the condition for executing scale-out in the processing system 104 is met, and thus a wasteful resource cost can be prevented from being incurred.

Figure 7:
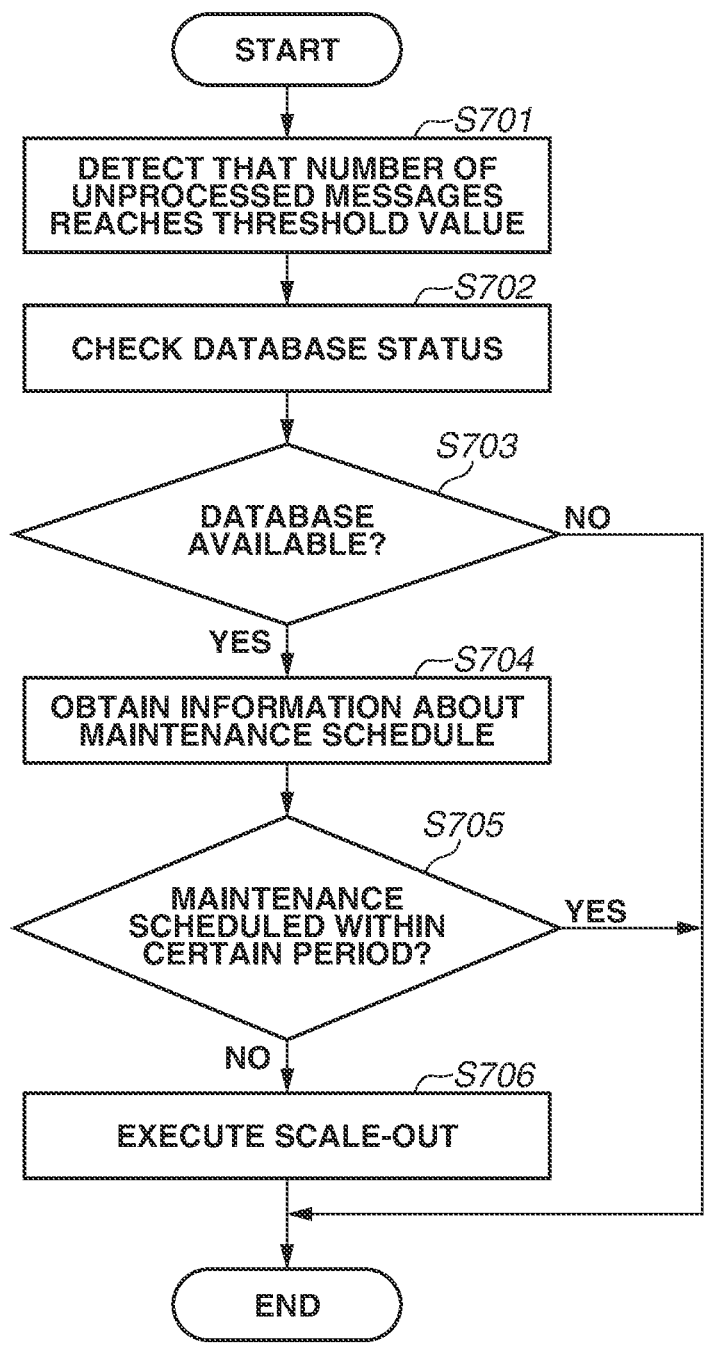
FIG. 7 is a flowchart illustrating resource adjustment processing by the resource manager.

According to the first exemplary embodiment, in a case where the database 105 is available, the auto scaling management unit 302 requests the resource generation unit 303 to increase the resource amount. However, even if the database 105 is available at the time of checking, there is a case where maintenance of the database is scheduled within a certain period of time. In other words, if the database 105 becomes unavailable immediately after increasing the resource amount, addition of the resource is wasted. Thus, according to a second modification, in a case where the database 105 is in an available state but is scheduled to become unavailable within a certain period of time, the auto scaling management unit 302 does not request the resource generation unit 303 to increase the resource amount. FIG. 7 is a flowchart illustrating the present processing by the resource manager 106 in detail.

In step S701, when the resource monitoring unit 301 detects that the number of unprocessed messages stored in the queue 103 reaches a threshold value, the resource monitoring unit 301 issues an Alarm event and notifies the auto scaling management unit 302 of the Alarm event. Upon receiving the notification, in step S702, the auto scaling management unit checks the status of the database 105. In step S703, the auto scaling management unit 302 determines whether the database 105 is available. In step S703, in a case where it is determined that the database 105 is available (YES in step S703), the processing proceeds to step S704. In step S704, the auto scaling management unit 302 obtains a maintenance schedule of the database 105. On the other hand, in a case where it is determined that the database 105 is unavailable (NO in step S703), the auto scaling management unit 302 terminates the processing. In step S705, in a case where it is determined that the maintenance is scheduled within the certain period of time from the present time (YES in step S705), the auto scaling management unit 302 terminates the processing as it is. On the other hand, in step S705, in a case where it is determined that the maintenance is not scheduled within the certain period of time from the present time (NO in step S705), the processing proceeds to step S706. In step S706, the auto scaling management unit 302 requests the resource generation unit 303 to generate the virtual machine, adds the generated virtual machine to the auto scaling group, and terminates the processing.

According to the present modification, in a case where the database 105 is in the available state but is scheduled to become unavailable within the certain period of time, the auto scaling management unit 302 does not request the resource generation unit 303 to increase the resource amount. Accordingly, a wasteful resource cost can be prevented from being incurred.

Figure 8:
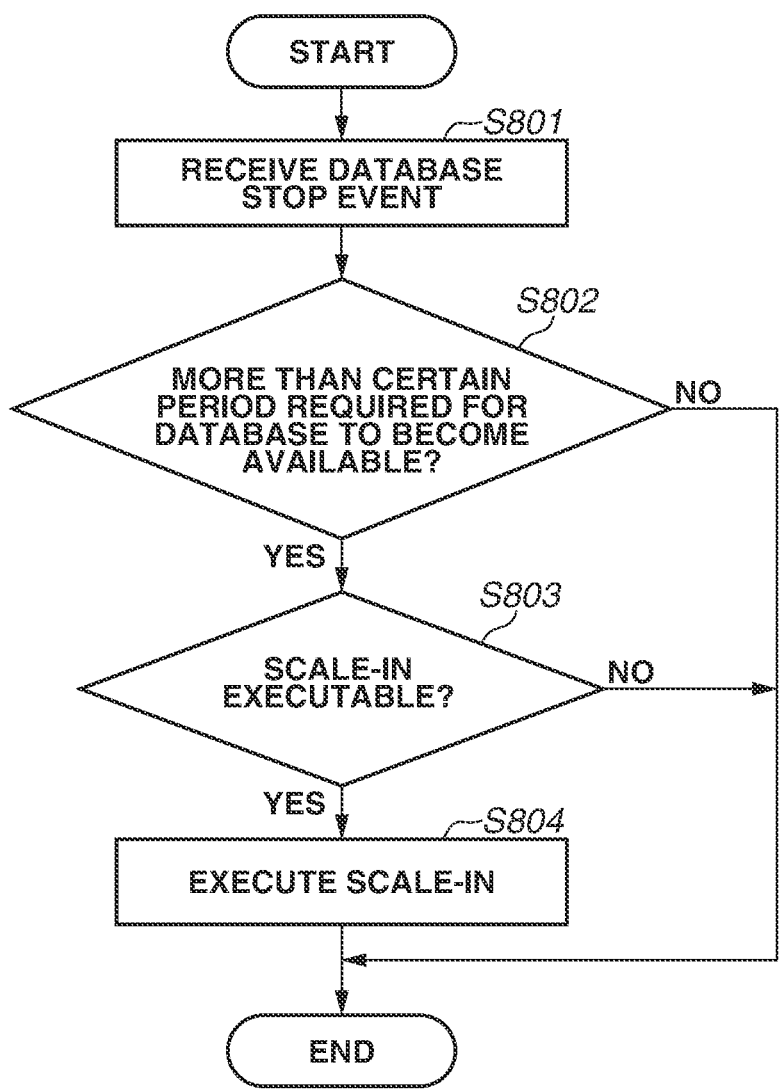
FIG. 8 is a flowchart illustrating resource adjustment processing by the resource manager.

According to the above-described first exemplary embodiment and the first and the second modifications, adjustment processing of the resource amount configuring the processing system 104 is executed in a case where the number of unprocessed messages stored in the queue 103 exceeds the threshold value. However, there may be a case where the database 105 becomes unavailable regardless of the number of messages existing in the queue 103. During a period of time where the database 105 is unavailable, processing on the message (performing processing on data obtained from the external system 110 and storing a processing result in the database 105) cannot be completed. Thus, if the virtual machines are operated more than necessary during this period, a wasteful resource cost is incurred. Therefore, in a third modification, the resource monitoring unit 301 detects that the database 105 becomes unavailable and decreases the number of the virtual machines in operation to the minimum number of the virtual machines set to the auto scaling group. FIG. 8 is a flowchart illustrating the present processing by the resource manager 106 in detail.

In step S801, when the auto scaling management unit 302 detects that the database 105 becomes unavailable (i.e., the auto scaling management unit 302 receives an event notification indicating that the database 105 becomes unavailable from the resource monitoring unit 301), the processing proceed to step S802. In step S802, the auto scaling management unit 302 determines whether the received event is the event notification requiring a certain period of time or more until the database 105 becomes available again. In a case where it is determined that the received event is not the event notification requiring the certain period of time or more until the database 105 becomes available again (NO in step S802), the processing ends as it is. On the other hand, in step S802, in a case where it is determined that the received event is the event notification requiring the certain period of time or more until the database 105 becomes available again (YES in step S802), the processing proceeds to step S803. In step S803, the auto scaling management unit 302 determines whether the scale-in can be executed. In step S803, in a case where it is determined that the scale-in can be executed (YES in step S803), the auto scaling management unit 302 advances the processing to step S804 and executes the scale-in up to the minimum number of the virtual machines set to the auto scaling group. The case where it is determined that the scale-in can be executed is a case where it is determined that the number of the virtual machines in operation is more than the minimum number of the virtual machines set to the auto scaling group. On the other hand, in step S803, in a case where it is determined that the scale-in cannot be executed (NO in step S803), the auto scaling management unit 302 ends the processing in the flowchart as it is.

According to the present third modification, in a case where a stop event indicating that the database 105 becomes an inaccessible state is received, the auto scaling management unit 302 decreases the resource amount of the processing system 104 if the database is inaccessible for a certain period of time. The processing illustrated in FIG. 8 can be executed in addition to the processing illustrated in any processing of FIGS. 4, 5, and 7. According to the present modification, it can prevent a wasteful resource cost from being incurred by operating the virtual machines more than necessary even though the database is unavailable.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2020-101026, filed Jun. 10, 2020, which is hereby incorporated by reference herein in its entirety.

What is claimed is:

1. An information processing system managing one or more processing systems, the information processing system comprising:

one or more memories; and one or more processors that execute a set of instructions to:

receive a scale-out event for a processing system configured to execute processing requiring access to a database, wherein the scale-out event is issued based on a scale-out condition, execute a predetermined application programming interface (API) for checking a state of the database in response to a reception of the scale-out event, wherein the database is accessed by processing executed by the processing system to which the scale-out event corresponds;

determine whether the database is in an inaccessible state or not based on an execution of the predetermined API;

execute, in response to reception of the scale-out event and in a case where the database is in an accessible state, a scale-out process that a number of the processing systems is increased;

restrict the scale-out process in a case where the scale-out event is received while it is determined that the database is in the inaccessible state;

determine, in response to the reception of the scale-out event and in a case where the database is in the inaccessible state, whether a scale-in process of the processing systems currently in operation is executable based on a minimum number of the processing systems set to a management group for auto scaling of the processing systems; and execute, in a case where it is determined that the scale-in process of the processing systems currently in operation is executable, a scale-in process by reducing the number of the processing systems currently in operation to the minimum number of the processing systems.

2. The information processing system according to claim 1,
wherein, in a case where it is determined that the database is in the accessible state and maintenance of the database is scheduled within a certain period of time, the scale-out process is restricted.

3. The information processing system according to claim 1, further comprising:
a load distribution apparatus configured to transfer one or more requests received from an external apparatus to a plurality of transfer destinations, wherein the one or more requests includes a request related to the processing requiring access to the database;
a queue soring one or more messages corresponding to the one or more requests; and
wherein the scale-out event is issued when at least any one of a number of requests processed by the load distribution apparatus per unit time, a number of unprocessed messages stored in the queue, and central processing unit (CPU) utilization and memory utilization allocated to the processing system satisfies the scale-out condition.

4. The information processing system according to claim 1,
wherein the processing system is realized by serverless computing, and
wherein a number of tasks necessary for executing an application is adjusted.

5. A control method for an information processing system managing one or more processing systems, the control method comprising:
receiving a scale-out event for a processing system configured to execute processing requiring access to a database, wherein the scale-out event is issued based on a scale-out condition;
executing a predetermined application programming interface (API) for checking a state of the database in response to a reception of the scale-out event, wherein the database is accessed by processing executed by the processing system to which the scale-out event corresponds;
determining whether the database is in an inaccessible state or not based on an execution of the predetermined API;
executing, in response to reception of the scale-out event and in a case where the database is in an accessible state, a scale-out process that a number of the processing systems is increased;
restricting the scale-out process in a case where the scale-out event is received while it is determined that the database is in the inaccessible state;
determining, in response to the reception of the scale-out event and in a case where the database is in the inaccessible state, whether a scale-in process of the processing systems currently in operation is executable based on a minimum number of the processing systems set to a management group for auto scaling of the processing systems; and
executing, in a case where it is determined that the scale-in process of the processing systems currently in operation is executable, a scale-in process by reducing the number of the processing systems currently in operation to the minimum number of the processing systems.

* * * * *